INVENTORS
RICHARD E. MERRILL
THOMAS RAPHAEL

United States Patent Office 3,039,913
Patented June 19, 1962

3,039,913
REINFORCED RESIN SHEET
Richard E. Merrill, Wakefield, and Thomas Raphael, Winchester, Mass., assignors to Arthur D. Little, Inc., Cambridge, Mass., a corporation of Massachusetts
Filed May 4, 1959, Ser. No. 810,601
12 Claims. (Cl. 162—136)

This invention relates to a novel reinforced resin sheet which is particularly well suited as an electrical insulation material and to a process for making it.

In the manufacture of hermetically sealed motors, it is necessary to have an insulating material which exhibits a high dielectric strength even after prolonged exposure to water. This insulation material should also be flexible enough to be folded through 180° without cracking or appreciable loss of dielectric strength. This means that the insulating material must be formed in such a way as to be capable of preventing the passage of an electric current therethrough even when wet. Moreover, such an electric insulation material should show low extraction characteristics in refrigerant systems particularly, and in such organic solvents, lubricants and the like to which electric motors would normally be exposed.

It has been customary in the making of insulating material to be used in splashproof electric motors, or motors designed to operate in high humidity areas without leaking current, to treat cellulosic papers by impregnating them with a resin such as phenol-formaldehyde. Paper has also been treated with aluminum acetate and paraffin wax, with stearato complexes or with silicone treating agents. None of these treated cellulosic products has been entirely satisfactory since the introduction of resins into a cellulosic material in quantities sufficient to waterproof them has resulted in most cases in the production of a very stiff and brittle material. Moreover, such treatments as have been used on cellulosic materials have tended to concentrate the waterproofing effects on the outside surface of the paper. This is not desirable for the production of a material which should exhibit a high dielectric strength, for it is necessary that such insulating materials should possess good wet dielectric strength throughout. Moreover, limiting a treatment to the surface means that there exists a possibility of lateral leakage especially if the paper is cut subsequent to treatment. The problem of lateral leakage also occurs in an insulation material made by laminating a plastic film to a paper. The basic material, i.e., cellulose, has, moreover, certain drawbacks in the fact that it has fixed physical and chemical properties which can be varied only by excessive chemical modification or treatment which then detracts from the overall properties of the material. Furthermore, cellulosic materials have specific temperature limitations which restrict them to certain types of motors.

It would, therefore, be desirable to have an electrical insulating material which is non-cellulosic in nature and insenstiive to moisture, which exhibits an extremely high dielectric strength and which at the same time shows very low extraction characteristics in refrigerants and in such lubricants and the like to which electric motors are normally exposed.

It is therefore an object of this invention to provide a flexible material formed entirely of synthetic materials which has high dielectric strengths throughout, for example as much as a thousand volts per mil and which at the same time exhibits very low extraction characteristics in refrigerants and other substances to which electric motors are exposed. It is another object to provide a new type electrical insulating material suitable for use in splashproof motors designed to operate in high humidity areas without leaking current. It is still another object to provide such material which can withstand higher temperatures than cellulosic materials and which at the same time can maintain high dielectric strength and physical properties for a longer period of time. It is yet another object to provide a new sheet material comprised of a synthetic film and reinforced with synthetic fibers. Still another object is to provide a process for forming a synthetic material in a sheet or strip form which is reinforced by synthetic fibers and which possesses a number of new desirable characteristics. These and other objects will become apparent in the following discussion.

The improved insulating material of this invention is a dense sheet or strip comprising acrylic-base resin reinforced by acrylic fibers characterized by having a density greater than 1.05 and a dielectric strength greater than 450 volts per mil. The resin in the final insulating material is present in a concentration ranging from about 50 to 90% by weight of the final insulating material. It is preferable that a major portion of the acrylic fibers are of the fibrillating type so that when the fibers are sheeted out from a water slurry, the resulting sheet, when the water content is reduced to 25%, has a wet strength of at least one pound/inch width which is sufficient to permit the fiber sheet to be handled prior to its use in reinforcing the resin sheet.

Visual examination of the final insulating material shows it to be a translucent sheet in which the acrylic fibers are detectable. These fibers are, however, so spaced that although they achieve some intercontacting they are not sufficiently intermeshed to provide their own bonding. Thus, the insulating material of this invention may be termed a fiber-reinforced densified acrylic resin sheet. This is to be contrasted with an acrylic resin paper which may later be treated with a resin material.

The process of this invention and the resulting product may be more clearly described with reference to the accompanying drawings in which FIG. 1 is a flow diagram of the process of this invention;

Figure 1:
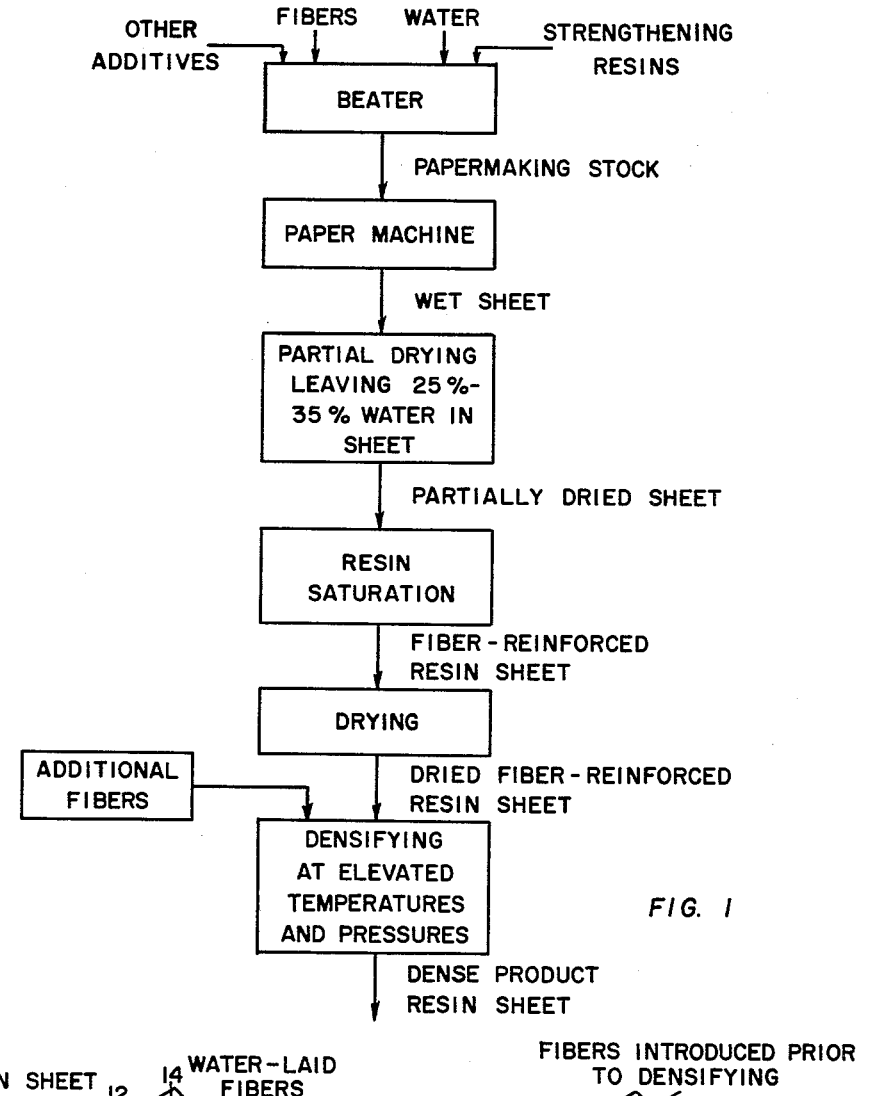

The process by which the fiber-reinforced resin material is made is shown in diagrammatic fashion in FIG. 1. The process comprises the steps of forming an aqueous stock of the synthetic fibers (the stock having a consistency ranging between .01 and .15%) forming a sheet from said stock, reducing the water content in said sheet to not below 25% by weight, incorporating into the resulting still wet sheet a quantity of resin ranging from about 50 to 90% by weight of the final product, drying the resulting reinforced resin sheet to remove substantially all of the water remaining therein and densifying the resulting dry resin sheet at a temperature above which the resin is fused but below that at which the fibers are softened and under specific pressure conditions. During the pressing period which endures for at least 30 seconds and preferably for as much as two or three minutes, the reinforced resin sheet is brought under a pressure of at least 600 p.s.i., and preferably 1050 p.s.i., momentarily and is then maintained under a pressure of at least 50 to 100 p.s.i. for the remaining portion of the pressing period.

A portion of the reinforcing fibers may be introduced during the densifying step by depositing on one or both surfaces of the resin sheet or strip, just prior to densifying, long acrylic fibers which may or may not be formed into a non-woven mat. These fibers which are introduced just prior to densification are completely embedded in the resin and the resulting sheet or strip has a smooth surface. Up to about 50 percent of the total resin fibers used to reinforce the resin sheet may be introduced in this manner. The principal advantage which is realized by introducing a portion of the resin fibers just prior to densification is a marked increase in tear strength as illustrated in Example IV.

There are in the process of this invention two important steps, namely the partial drying of the fibers to the extent that at least 25% by weight of water remains and the densifying of the dry sheet under the unique conditions specified. Each of these steps will be discussed in detail below.

In forming the acrylic fiber sheet required as the reinforcing medium of the insulating material of this invention, acrylic fibers are beaten in water to form an aqueous stock. It has been found preferable to reduce the consistency of this stock to between about 0.01 and 0.15%. The acrylic fibers and acrylic base resins which are used to impregnate the sheet of fibers may be any of those known in the art. The word "acrylic" hereinafter is used to designate polymers and copolymers comprising acrylic, substituted acrylic, and methacrylic acids, and salts, esters and other derivatives such as nitriles and amides.

Processes by which certain acrylic fibers may be made so that they may be fibrillated are known, see for example U.S.P. 2,558,730. Because it is desirable to be able to handle the wet web of fibers without the use of a supporting screen or wire, it has been found preferable to use acrylic fibers, the major portion of which (about 50% by weight) are of the fibrillatable type. By fibrillatable is meant fibers which when beaten, or otherwise mechanically stressed, develop fibrils which are capable of interbonding. In any event, the portion of fibrillated fibers should be sufficiently great to achieve enough interbonding through the fibrils to impart to a sheet containing at least 25% water a wet strentgh of at least one pound/inch width and preferably at least 1.6 pounds/inch width. These wet tensile strengths are based on 90 pound/ream sheets with a ream being further defined as 24″ x 36″—500 sheet basis. Wet webs possessing the minimum tensile strengths specified may be handled without a support and be treated with the resin.

In order to impart added wet strength to the wet sheet which is to reinforce the resin, certain additives may be added in the furnish to accomplish this, particularly where the amount of fibrillatable acrylic fibers is relatively low, e.g., about 60 to 65%. The additives used to impart wet strength may be an acrylic resin emulsion or a water dispersion, or a solution of a phenolic or urea-formaldehyde resin. These strengthening resins are conveniently added to the stock and may be used up to about 1 to 10% by weight of the acrylic fibers present in the stock.

The acrylic resin fibers are preferably those which range from about 1–8 denier, with those of about 3 denier being preferred since fibers greater than 3 denier have been found to add little strength to the sheet. Fibers of less than about 3 denier do not fibrillate as well and are somewhat difficult to disperse in water unless a fiber deflocculant is used. Thus deflocculants may be used if the fibers require them, but they are not necessary if the fibers are prepared and used so that they exhibit good fibrillating characteristics.

A portion, i.e., up to about 50% by weight of the fibers used to reinforce the resin in accordance with this invention may be introduced just prior to the densifying step of this process. The type of fibers and their method of introduction is described in connection with the description of the densifying step.

The aqueous stock of acrylic resin fibers is made into a sheet or paper-like material using paper-making machines in any of their modifications including vacuum-forming techniques or a Fourdrinier may be used. The acrylic fiber sheet coming from the paper machine contains about 70% by weight water. This water content is reduced to about from 25% to about 35% by any suitable drying means such as on a drum dryer. It is preferred to reduce it to just about 25% by weight of the sheet. Other drying methods including the use of a conventional type oven, infrared heating and the like may be used. If more than about 35% water is allowed to remain in the sheet before resin treatment, it is difficult to incorporate the amount of resin required and additional drying time is required.

Maintaining the water content of the wet fiber sheet at the level specified results in a stronger final resin sheet and in an insulation material having a higher dielectric strength than if the resin fiber sheet were dried before the resin emulsion or dispersion is applied. Attainment of this added strength is believed to be attributable to the fact that better wetting with the resin is obtained when the fibers are wet, thus permitting the resin to better penetrate the fiber web and to cover the fibers substantially completely and uniformly. Thus, the resin completely impregnates the fiber web, any entrapped or occluded gas (air) is driven out and the possibility of fissures or cracks in the resin sheet is minimized. The overall result is to eliminate or minimize the factors which are detrimental to the formation of a material having a high dielectric strength. Thus it is shown that the control of the water content in the synthetic fiber sheet just prior to resin incorporation is important in the process of this invention.

The resin fiber sheet containing about 25% by weight water is then treated with an acrylic base resin, usually in the form of an aqueous emulsion or dispersion to form a fiber-reinforced resin. This is accomplished by saturating the wet fiber sheet with resin by any technique known in the art. Saturation is carried out to the extent that the final dry, dense material contains from about 50 to 90% by weight resin, preferably about 75% by weight resin. Although saturation may be accomplished by one or more immersions of the acrylic fiber sheet in a resin emulsion, it has been found preferable to effect saturation in two steps: saturating the resin fiber sheet by first passing it through or floating it on the resin emulsion (the latter serving to expose one surface to the resin) and then coating the resulting impregnated fiber sheet with the emulsion after passing it through a series of squeeze rolls to remove excess material and drying to remove a major portion of the water. The emulsion used in the coating step may be thickened to increase its viscosity to the extent that it may be applied smoothly and evenly on the surface of the resin treated web. By this process it is possible to saturate the synthetic fiber web so that the final resin sheet will contain up to 90% resins by weight. Normally a single pass through the resin emulsion bath will give a total resin pick up on a solids basis of about 55% based on the weight of the final dry product. This was with the use of a resin emulsion which contained about 48% total solids. Of course, the resin pick up can be varied by varying the total solids content of the saturating resin emulsion used.

The saturating resin is a water-base dispersion or emulsion of an acrylic-base resin, i.e., one containing a major portion of an acrylic resin and a minor amount (less than 50%) of another resin if it is desirable to impart characteristics other than those obtainable through the use of only acrylic resins to the finished material. For example, although an emulsion or dispersion containing only acrylic resins may be used, it has been found that a small amount of a water-soluble phenol-formaldehyde resin improves the properties of the resin sheet as an insulating material. This is illustrated by the fact that a mixture of 96% acrylic resin and 4% phenol-formaldehyde resin (solids content basis) has been found to be very suitable for making a dense resin material having a high dielectric strength. Commercially available acrylic resins in which acrylics are copolymerized with other resinous material such as butadiene rubber and the like have also been found suitable with or without the addition of a phenol-formaldehyde resin.

If the saturation of the acrylic fiber sheet is to be accomplished by immersion and subsequent coating as described below, the saturating acrylic-base emulsion may be thickened to give it a satisfactory viscosity for coating by any suitable method such as by raising the pH by adding ammonia, for example, or by the addition of a small amount of a thickening agent such as sodium polyacrylate.

After the saturation of the fiber sheet has been completed and the desired amount of resin introduced, the resulting fiber containing resin sheet is dried by any suitable and convenient means to remove substantially all of the water contained therein. Drying may be accomplished by the use of a conventional drum dryer, in an oven or by any other suitable means such as infrared radiation and the like.

The final step in the process of this invention is one of densification which may or may not be accompanied by the introduction of an additional quantity of fibers. It has been found that this densification step is necessary to the production of a final material which is to have a high dielectric strength. Densification must include the application of both pressure and temperature to the sheet for a finite period of time as contrasted with instantaneous application of pressure. Thus, attempts to densify the material by means of a calendering or glazing machine or other apparatus which gives an instantaneous pressure at a given temperature has not proved satisfactory. It has been found that it is necessary for the practice of this invention to bring the fiber-reinforced resin sheet or strip to a temperature of at least 300° F., maintain it at that temperature for at least from 30 seconds to three minutes while a pressure of at least 600 to 1,050 p.s.i. is applied momentarily and then a pressure of from about 50 to about 100 p.s.i. is applied throughout the remaining period specified. It has been found preferable to employ pressures in the higher ranges, i.e., of about 1,000 p.s.i. momentarily and then about 75 to 100 p.s.i. for the remaining period of pressure application. The longer pressure times, i.e., of about one to two minutes, are also preferred. Experimental determinations have shown that when densification conditions other than those specified are used the density of the final sheet is lower than that desired and the dielectric strength falls off rapidly. The final sheet should have a minimum density of about 1.05 and preferably of about 1.10 gm./cc.

The effect of densification may be clearly illustrated by experimental data. When densification was carried out to the extent that the final density of the reinforced resinous material was 0.92, it had a dielectric strength of 175 volts per mil. When this density was increased to 1.05, the dielectric strength was raised to 450 volts per mil and when the density was raised to 1.10 the dielectric strength was slightly over a 1,000 volts per mil.

As noted above, a portion (up to about 50% by weight) of the fibers used for reinforcing may be introduced on the resin sheet surface just prior to the densification step. Fibers which are introduced at this point of the process should be relatively long carded fibers, i.e., at least one-half inch and preferably from about one to one and one-half inches long. These fibers may range from about 15 to 40 microns in diameter and preferably from about 25 to 35 microns. Although acrylic fibers will be used to embed in the surface if an all-acrylic reinforced resin is desired, other synthetic fibers such as polyesters and polyamides may be mixed with or used alone as the embedded fibers introduced just prior to densification to achieve certan desired physical properties. The layer of fibers thus deposited on one or both surfaces of the resin sheet prior to densification will depend, of course, upon the amount of fibers introduced in this manner. Generally, however, the layer will range from about one to about 5 to 10 fiber diameters thick.

Although it has been found convenient to introduce these fibers in the form of a non-woven mat, they may be laid as individual fibers on the surface or surfaces of the resin sheet. The fibers need not be laid unidirectionally but for some purposes this may be desirable.

In the process of densification the fibers deposited on the surface are substantially embedded in the resin sheet leaving the sheet with a smooth surface throughout. The marked increase in tear strength imparted to an insulating material by these fibers is illustrated in Example IV.

Figure 2:
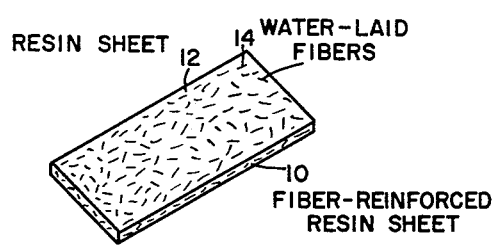
FIG. 2 illustrates the product of this invention.
Figure 3:
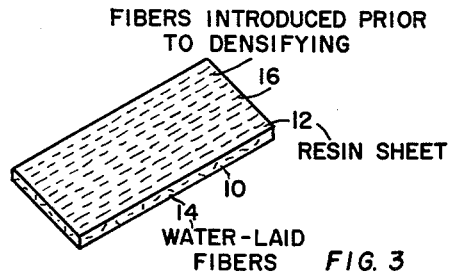
FIG. 3 illustrates a modification of the product of this invention.

The finished fiber-reinforced resin sheet of this invention is shown in two modifications in FIGS. 2 and 3. It will be appreciated that the drawings in these two figures are somewhat schematic in nature. In FIG. 2 the fiber reinforced resin sheet 10 is seen to consist of the densified resin 12 through which the reinforcing fibers 14 are randomly distributed. As pointed out above, it is not necessary for these fibers to be interlocked inasmuch as their primary role is that of reinforcing the dense resin sheet. The fibers 14 in FIG. 2 are randomly oriented since the fiber reinforced resin sheet of this figure illustrates the final product which results when all of the fibers are introduced in the papermaking stock.

In the fiber-reinforced resin sheet illustrated in FIG. 3, a portion of the fibers was introduced on top of the sheet and aligned as shown at 16 just prior to the densifying step. The randomly placed fibers 14 which were present in the wet sheet may be seen at the sides of the sheet. It should be understood that each of these sheets has a surface which is smooth to the touch, the fibers, no matter how introduced, having been substantially completely embedded in the resin.

The invention may be further described in the following examples which are meant to be illustrative and not limiting.

*Example I*

A water slurry containing 3-denier acrylic fibers was made up to a consistency of 0.15%. The acrylic fiber used was a fibrillatable fiber and no additional binder was required to give the resulting sheet the required wet strength. The aqueous slurry was passed onto a vacuum-forming cylinder machine and a wet sheet made which contained approximately 70% water by weight. The wet strength of the sheet thus formed was sufficient for handling purposes and could be carried through the resin treatment step without the aid of a wire or other backing device. The sheet as formed on the wire was passed through a drying oven to reduce the moisture content from the original 70% to 25% based on the dry fiber weight. The partially dried sheet was then passed through a resin emulsion which was an acrylic resin modified with a water-soluble phenol-formaldehyde resin during its manufacture (sold by E. I. du Pont de Nemours Company, Inc., under the trade name Lecton Insulating Finish RK6305).

The partially saturated sheet was then passed through a set of squeeze rolls and partially dried in an oven to remove some of the moisture, again to about a 25% by weight level. The sheet was then coated with a quantity of the saturating emulsion which had been thickened to a coating consistency by the addition of ammonia. The final total resin content of the sheet was about 75% by weight. Substantially all of the remaining moisture was removed in a drying oven. Densification was accomplished at a temperature of 325° F. for three minutes. During this pressing time a momentary pressure of 1,050 p.s.i. was first applied and then the sheet was pressed at 92 p.s.i. for the remaining pressing period. The density of the final material was 1.1 gm./cc. and it had a measured dielectric strength of 1,050 volts per mil.

Dielectric strength was determined in all cases in accordance with the procedure set down in ASTM Standards, Part 6, page 493, Test D149-55 (1955).

*Example II*

A water slurry of acrylic fibers was made up to an 0.1% concentration. The acrylic fibers comprised 65% by weight of fibrillatable fibers and 35% by weight of non-fibrillatable fibers. After the slurry had been beaten sufficiently, a quantity of Uformite No. 711 (a urea-formaldehyde water soluble resin manufactured by Rohm & Haas Company) was added so that there was present in the slurry about 2% urea-formaldehyde solids based on the weight of the fibers present.

The slurry was introduced into a Fourdrinier machine and a wet sheet made as in Example I. This sheet was then saturated, dried and densified as in Example I. The resulting insulating material had dielectric properties similar to those of the material of Example I.

*Example III*

A sheet of acrylic fiber was formed as in Example I and saturated with an aqueous emulsion which was a mixture of an acrylonitrile-butadiene resin (41.4% by weight solids basis) and a water soluble phenol-formaldehyde resin. The resin mixture contained 35% by weight of the phenol-formaldehyde resin. The acrylic fiber sheet containing about 25% water was floated on this resin emulsion mixture, partially dried to the extent that there remained about 25% water and then subsequently passed through the resin emulsion mixture to achieve a 50% dry resin pick-up based on the weight of the final dry sheet. This saturated material was then dried as in Example I and densified as described in that example. The resulting dense acrylic base resin, reinforced by acrylic fibers, had a measured dielectric strength of 750 volts/mil.

*Example IV*

Fiber-reinforced resin sheets were made up to the point of densification as in Example I. The resin content of the sheets (on a dry basis) was about 74% by weight. The first of these sheets was then densified as in Example I. Mats of Orlon fibers, averaging about one-inch long and from 16 to 30 microns in diameter in the form of non-woven webs were placed on each side of a second resin sheet . The weight of these Orlon fibers (an acrylic fiber sold by E. I. du Pont de Nemours & Company, Inc.) was approximately equal to the weight of the fibers introduced in the original water-laid web. This assembly was then densified in the same manner as the first sheet.

The two insulation strips or sheets thus formed were essentially the same on visual examination but the tear strength of the second had been materially increased as illustrated by the fact that it had a tear strength of 32 gm./mil in the machine direction and 47 gm./mil in the cross-machine direction. Comparable tear strengths for the first sheet were 20 and 22 gm./mil, respectively.

*Example V*

Duplicate samples were made up as in Example IV with the exception that strands of Dacron fibers (a polyester fiber sold by E. I. du Pont de Nemours & Company, Inc.) of approximately the same length and diameter were substituted for the Orlon fiber non-woven mat placed on the surfaces of the second resin sheet. Densification was accomplished as in Example IV. In addition to imparting improved tear strength, as in the case of Orlon fibers, the Dacron fibers made the resin sheet somewhat more stiff.

The insulating sheets made in accordance with this invention exhibit a combination of dielectric strengths and physical properties heretofore not believed to have been achieved by any insulating material. Moreover the insulating material of this invention shows extremely low extraction characteristics in refrigerants, lubricants and other substances to which they may be exposed in an electric motor. The insulation sheets are furthermore sufficiently flexible to be bent and rolled to the extent required in their use as insulating material in electric motors.

The insulation material of this invention also possesses certain specific advantages over cellulose-base insulating material. Where the latter is limited to installation in Class A motors in which temperatures are limited to 105° C., the insulation material of this invention may be used in Class B motors, which operate up to 130° C. With the present general trend toward making electric motors smaller and more compact there results the requirement for materials which can operate successfully at high temperatures because of less heat dissipation. The desirability of the improved performance of the insulation material of this invention therefore becomes apparent.

Finally, the insulation material of this invention is capable of maintaining its high dielectric strength and its physical properties over extended periods of operation, even at elevated temperatures.

We claim:

1. Process for forming a dense acrylic-base resin sheet reinforced by acrylic resin fibers, comprising the steps of forming an aqueous stock of said fibers, sheeting out said stock to form a web, reducing the water content in said web to from about 25 to 35% by weight, incorporating into the resulting wet fiber sheet a quantity of acrylic-base resin ranging from about 50 to 90% solids by weight of total solids, said resin having an acrylic content of at least 50%, removing substantially all of the water remaining in the resulting fiber-reinforced resin and densifying the resulting dry resin sheet under pressure at a temperature of about 325° F. for a period from about 30 seconds to about two minutes, said pressure being applied at from about 600 to about 1050 p.s.i. momentarily and then from about 50 to about 100 p.s.i. for the remaining portion of said period.

2. Process for forming a dense acrylic-base resin sheet reinforced by acrylic resin fibers, comprising the steps of forming an aqueous stock of said fibers, sheeting out said stock to form a web, reducing the water content in said web to from about 25 to 35% by weight, incorporating into the resulting wet fiber sheet a quantity of acrylic-base resin ranging from about 50 to 90% solids by weight of total solids, said resin having an acrylic content of at least 50%, removing substantially all of the water remaining in the resulting fiber-reinforced resin, depositing on at least one surface of the resulting dry resin sheet additional synthetic fibers and densifying the resulting assembly of said additional fibers and said resin sheet under pressure at a temperature of about 325° F. for a period from about 30 seconds to about two minutes, said pressure being applied at from about 600 to about 1050 p.s.i. momentarily and then from about 50 to about 100 p.s.i. for the remaining portion of said period.

3. Process for forming a dense acrylic-base resin sheet reinforced by acrylic resin fibers, comprising the steps of forming an aqueous stock of said resin fibers of a consistency ranging between .01 and .15%, sheeting out said stock to form a web, reducing the water content in said web to about 25% by weight, incorporating into the resulting wet fiber sheet a quantity of acrylic-base resin ranging from about 50 to 90% solids by weight of total solids, said resin having an acrylic content of at least 50%, removing substantially all of the water remaining in the resulting fiber-reinforced resin and densifying the resulting dry resin sheet under pressure at a temperature of about 325° F. for a period from about 30 seconds to about two minutes, said pressure being applied at from about 600 to about 1050 p.s.i. momentarily and then from about 50 to about 100 p.s.i. for the remaining portion of said period.

4. Process for forming a dense acrylic-base resin sheet reinforced by acrylic resin fibers, comprising the steps of forming an aqueous stock of said resin fibers of a consistency ranging between .01 and .15%, sheeting out said stock to form a web, reducing the water content in said web to about 25% by weight, incorporating into the resulting wet fiber sheet a quantity of acrylic-base resin ranging from about 50 to 90% solids by weight of total solids, said resin having an acrylic content of at least 50%, removing substantially all of the water remaining in the resulting fiber-reinforced resin, depositing on at least one surface of the resulting dry resin sheet additional synthetic fibers, and densifying the resulting assembly of said additional fibers and said resin sheet under pressure at a temperature of about 325° F. for a period from about 30 seconds to about two minutes, said pressure being applied at from about 600 to about 1050 p.s.i. momentarily and then from about 50 to about 100 p.s.i. for the remaining portion of said period.

5. Process in accordance with claim 4 wherein said additional synthetic fibers are deposited on said resin sheet in the form of a nonwoven mat.

6. Process for forming a dense acrylic-base resin sheet reinforced by acrylic resin fibers, comprising the steps of forming an aqueous stock of acrylic fibers of a consistency ranging between .10 and .15%, sheeting out said stock to form a web, reducing the water content of said web to about 25% by weight, saturating the resulting wet fiber sheet in an acrylic-base resin emulsion, said resin having an acrylic content of at least 50%, removing the excess resin and water from the resulting saturated sheet, coating said saturated sheet with an additional quantity of said resin emulsion, drying the resulting coated sheet to remove substantially all of the water remaining therein, and densifying the resulting dry fiber-reinforced resin sheet under pressure at a temperature of about 325° F. for a period from about 30 seconds to about two minutes, said pressure being applied at from about 600 to about 1050 p.s.i. momentarily and then from about 50 to about 100 p.s.i. for the remaining portion of said period.

7. Process in accordance with claim 6 wherein said saturating step comprises immersing said wet fiber sheet in said resin emulsion.

8. Process in accordance with claim 6 wherein said saturating step comprises floating said wet fiber sheet on said resin emulsion.

9. Process in accordance with claim 6 further characterized by the step of thickening said additional quantity of said resin emulsion used in said coating step.

10. Process for forming a dense acrylic-base resin sheet reinforced by acrylic resin fibers, comprising the steps of forming an aqueous stock of acrylic fibers of a consistency ranging between .10 and .15%, sheeting out said stock to form a web, reducing the water content of said web to about 25% by weight, saturating the resulting wet fiber sheet in an acrylic-base resin emulsion, said resin having an acrylic content of at least 50%, removing the excess resin and water from the resulting saturated sheet, coating said saturated sheet with an additional quantity of said resin emulsion, drying the resulting coated sheet to remove substantially all of the water remaining therein, depositing on at least one surface of the resulting dry resin sheet additional synthetic fibers, and densifying the resulting assembly of said additional fibers and said resin sheet under pressure at a temperature of about 325° F. for a period from about 30 seconds to about two minutes, said pressure being applied at from about 600 to about 1050 p.s.i. momentarily and then from about 50 to about 100 p.s.i. for the remaining portion of said period.

11. Process for forming a dense acrylic-base resin sheet reinforced by acrylic resin fibers, comprising the steps of forming an aqueous stock of acrylic fibers, incorporating into said stock a resin capable of imparting wet strength to a web formed from said fibers, sheeting out said stock to form a web of said fibers, reducing the water content in said web to about 25% by weight, incorporating into the resulting wet fiber sheet a quantity of acrylic base resin ranging from about 50 to 90% solids by weight of total solids, said resin having an acrylic content of at least 50%, removing substantially all of the water remaining in the resulting fiber-reinforced resin and densifying the resulting dry resin sheet under pressure at a temperature of about 325° F. for a period from about 30 seconds to about two minutes, said pressure being applied at from about 600 to about 1050 p.s.i. momentarily and then from about 50 to about 100 p.s.i. for the remaining portion of said period.

12. A dense acrylic-base resin sheet reinforced with acrylic fibers, having a density greater than 1.05 and a dielectric strength greater than 450 volts per mil formed by the process of claim 1.

References Cited in the file of this patent
UNITED STATES PATENTS

| | | |
|---|---|---|
| 2,673,824 | Biefeld et al. | Mar. 30, 1954 |
| 2,676,128 | Piccard | Apr. 20, 1954 |
| 2,774,687 | Nottebohm | Dec. 18, 1956 |
| 2,795,524 | Rodman | June 11, 1957 |

OTHER REFERENCES

Du Pont Multi-Fiber Bulletin X-95, Du Pont Company, Wilmington, Del., December 1958.